United States Patent [19]

Takanishi et al.

[11] Patent Number: 5,679,481
[45] Date of Patent: Oct. 21, 1997

[54] CATHODE MATERIAL, METHOD OF PREPARING IT AND NONAQUEOUS SOLVENT TYPE SECONDARY BATTERY HAVING A CATHODE COMPRISING IT

[75] Inventors: Keijiro Takanishi; Yoshio Matsuda; Jun Tsukamoto, all of Shiga, Japan

[73] Assignee: Toray Industries, Inc., Tokyo, Japan

[21] Appl. No.: 555,430

[22] Filed: Nov. 9, 1995

[30] Foreign Application Priority Data

Nov. 9, 1994 [JP] Japan .................... 6-275432
Apr. 25, 1995 [JP] Japan .................... 7-101081

[51] Int. Cl.$^6$ .................................................. H01M 4/02
[52] U.S. Cl. .................................. 429/223; 429/218
[58] Field of Search .......................... 429/218, 220, 429/222, 223; 29/623.1

[56] References Cited

U.S. PATENT DOCUMENTS

| | | | |
|---|---|---|---|
| 5,393,622 | 2/1995 | Nitta et al. | 429/233 |
| 5,395,711 | 3/1995 | Tahara et al. | 429/197 |
| 5,407,762 | 4/1995 | Mitate et al. | 429/197 |

*Primary Examiner*—M. Nuzzolillo
*Attorney, Agent, or Firm*—Morrison & Foerster LLP

[57] ABSTRACT

A cathode material for a lithium ion secondary battery comprises a compound of the formula $$Li_{1-X-a}A_X Ni_{1-Y-b}B_Y O_2.$$

wherein:

A is an alkaline earth metal component selected from the group consisting of (1) at least two of magnesium, calcium, strontium and barium, (2) strontium alone and (3) barium alone;

B is at least one transition metal element other than Ni;

X is the total number of moles of A and if A consists of more than one alkaline earth metal element, then X is the total number of moles of all alkaline earth metal elements;

Y is the total number of moles of B and if B consists of more than one transition metal element, then Y is the total number of moles of all transition metal elements; and X, Y, a and b satisfy the respective equations:

$0 < X \leq 0.10$ $0 < Y \leq 0.30$ $-0.10 \leq a \leq 0.10$ $-0.15 \leq b \leq 0.15.$

22 Claims, No Drawings

CATHODE MATERIAL, METHOD OF PREPARING IT AND NONAQUEOUS SOLVENT TYPE SECONDARY BATTERY HAVING A CATHODE COMPRISING IT

BACKGROUND OF THE INVENTION

The present invention relates to a cathode material for a lithium ion secondary battery, a method of preparing the cathode material, and a non-aqueous solvent type lithium ion secondary battery comprising the foregoing cathode material.

As the use of portable devices, such as video cameras and notebook-type personal computers, becomes more and more wide spread, there is more and more of a demand for compact and high capacity secondary batteries. Although secondary batteries, such as nickel-cadmium batteries using an alkaline electrolyte are available at present, these conventional batteries have a low battery voltage of about 1.2 V and it is difficult to increase the energy density. A high energy secondary battery which does overcome this problem, high energy secondary battery employing lithium metal as anode which, among the solid elemental substances, has the lightest specific gravity, namely, 0.534, the lowest potential, and the maximum current capacity per unit weight.

However, operation of a secondary battery of the type using lithium as the anode involves recrystallization of lithium (dendrite) in the form of branches of a tree on the surface of the anode during discharge, the recrystallized lithium being then allowed to grow due to the charge/discharge. The growth of dendrite deteriorates the cycling characteristic of the secondary battery and, if worst comes to worst, the dendrite breaks through an insulating membrane (a separator) disposed to prevent contact between the cathode and the anode and electrically shortcircuits with the cathode, possibly resulting in a fire and breakage of the battery. Accordingly, a secondary battery has been suggested, for example, as disclosed in JP-A 62-90863 in which a carbonaceous material, such as coke, is employed as an anode, alkali metal ions are doped and thereafter undoped. Thus, it was found that the foregoing secondary battery is able to prevent the foregoing problem of deterioration in the anode occurring due to repetition of charge and discharge. Furthermore, any of the foregoing carbonaceous materials can be doped with anion so as to be used as the cathode. Secondary batteries comprising electrodes formed by doping lithium ions or anion into the foregoing carbonaceous material are disclosed in JP-A 57-208079, JP-A 58-93176, JP-A 58-192266, JP-A 62-90863, JP-A 62-122066 and JP-A 3-66856.

These carbonaceous materials are allowed to be in any form such as carbon powder, carbon fiber (in any length) or structure made of carbon fiber.

Furthermore, batteries having a battery voltage level of about 4 V to meet the desire for a raised energy density have been disclosed recently and attracted attention. The level of the battery voltage has been raised by research and development of cathode materials with high electric potentials, namely oxides of transition metals including alkali metals and inorganic compounds, such as chalcogen compounds containing a transition metal. Among these, $Li_xCoO_2$ ($0<X\leq1.0$) and $Li_xNiO_2$ ($0<X\leq1.0$) are considered to be most hopeful in terms of high electric potential, satisfactory stability and long lifetime. In particular, $LiNiO_2$ has been energetically researched and developed because the cost of the raw material from which it is prepared is cheaper, the raw material can be supplied more stably and, even though $LiNiO_2$ is still a 4V class cathode material, it does have a somewhat lower charging potential than $LiCoO_2$ and therefore allows the electrolytic solution to be more stable as compared with that in which $LiCoO_2$ is present.

The cycling characteristic of a lithium ion secondary battery with $LiNiO_2$ as cathode material is not bad when the battery is used in circumstances where it needs only a relatively low charge capacity, and in which the battery is subjected repeatedly to a maximum charge and discharge of only about 100 mAh/g. However, when an attempt is made to the use the battery under circumstances where the battery is required to exhibit a higher charge capacity, in which the battery is then subjected repeatedly to a charge and discharge of at least 100 mAh/g, if not more, the capacity is in fact soon excessively reduced by such repeated charge and discharge, resulting in a poor cycling characteristic.

We have investigated the cause of the reduction in the discharge capacity occurring due to the charge and discharge cycle of the lithium secondary battery containing $LiNiO_2$ as the cathode material thereof, thus resulting in a conclusion that the cycle deterioration takes place due to two reasons, as follows: (1) as the covalent bond between nickel and oxygen is weaker than that between cobalt and oxygen, the layered structure tends to be destroyed partially when lithium is deintercalated at the charge. Therefore, the number of lithium ion sites in which lithium is intercalated at the discharge decreases and, therefore, the discharge capacity is reduced; (2) in the case of $LiCoO_2$, tetravalent cobalt generated due to deintercalation of lithium during discharge has an unpaired electron on the 3d-orbital (t2g) thereof, causing the electron conductivity to be enhanced during the charge. In the case of $LiNiO_2$, tetravalent nickel generated during the charge has the 3d-orbital (t2g) filled with six electrons and therefore has no unpaired electron, causing the electron conductivity to deteriorate during the charge. As a result, overpotential takes place at the initial stage of the discharge, thus resulting in deterioration in the discharge capacity.

Since phenomena (1) and (2) take place simultaneously in the case of $LiNiO_2$, it is considered that excessive cycle deterioration takes place when the charge and discharge cycles are repeated. Therefore, both (1) and (2) must be overcome to improve the practical cycling characteristic. Accordingly, a plurality of improvements in (1) have been suggested as disclosed, for example, in JP-A 5-299092 ($LiNi_{1-x}Mn_xO_2$), JP-A 6-150929 ($Li_xM_yNiO_2$ where M is Na and/or K), and JP-A 5-325966. JP-A 6-150929 discloses a structure in which sodium or potassium is partially substituted for lithium to maintain the layered structure when lithium is deintercalated at the charge. In that case, there arises a problem in that sodium or potassium in the lithium layer inhibits diffusion of lithium ions and therefore the discharge capacity is reduced. JP-A 5-299092 and JP-A 5-325966 have a structure in which manganese or cobalt is partially substituted for nickel to maintain the layered structure when lithium is deintercalated at the charge. However, that structure is unsatisfactory that it has not reduced the deterioration in the practical cycling characteristic to an extend required to provide a cycling characteristic of over 100 times.

JP-A 4-171659 discloses a compound prepared by partially substituting magnesium, which is an alkaline earth metal, for lithium in a mixed oxide, such as a lithium-cobalt mixed oxide. However, there is no suggestion that adaptation of the foregoing method by using a lithium-nickel mixed oxide might be expected to enlarge the capacity as compared with lithium-cobalt mixed oxide.

We have found that the discharge capacities of $LiNiO_2$ and $LiCoO_2$ in which an alkaline earth metal element is substituted for more than 10% of their lithium component are considerably reduced. Although the cycling characteristics of these cathode materials are slightly improved, these cathode materials do not yet suffice for lithium ion secondary batteries because of their lower capacities.

As for (2), a plurality of improvements have been suggested, for example, in JP-A 62-90863 and JP-A 6-124707. JP-A 62-90863 discloses $A_xM_yN_zO_2$ where A is an alkali metal element, M is a transition metal element, N is at least one element selected from Al, In and Sn a structure in which N is partially substituted for nickel to enhance electron conductivity. However, that tends to lower the discharge voltage, which raises a problem in that the characteristics of enabling high voltage level and high energy density expected from a lithium battery cannot be achieved. JP-A 6-124707 discloses the compound $Li_yNi_{1-x}Me_xO_2$, where Me is at least one element selected from Cu, Zn and Ag, a structure in which a transition metal element, such as copper is partially substituted for nickel so that the transition metal enhances electron conductivity. However, there is no reference to provide improvement in the cycling characteristic.

JP-A 5-283076 discloses the compound $Li_yNi_{1-x}Me_xO_2$ where Me is an element selected from Ti, V, Mn and Fe which compound has a structure in which a transition metal element is substituted for a portion of nickel, whereby the transition metal allows maintenance of the layered structure, when lithium is deintercalated at the charge and also to enhance electron conductivity. However, that structure is unsatisfactory on that it does not prevent sufficiently a deterioration in that a practical cycling characteristic, namely a cycling characteristic of over 100 times, cannot be achieved.

In addition, in a case where the typical method of preparation of these lithium nickel mixed oxides, such as $LiNiO_2$ is employed, difficulties also arise. In such a method, stoichiometric amounts of a Li-salt, such as LiOH, $Li_2CO_3$ or $Li_2O$ and a Ni-salt, such as $Ni(OH)_2$, $NiCO_3$ or NiO, are mixed and the mixture is heated in an oxidizing atmosphere. The space group of $LiNiO_2$ prepared is R-3m of hexagonal structure in which, in an ideal case, the layers, each consisting respectively of nickel, oxygen and lithium, are stacked up systematically in the c-axis direction. However a proportion of the nickel atoms tends to shift into lithium atom layers due to a slight fluctuation of heating conditions. As a result, the stoichiometry of lithium and nickel is changed and a compound of chemical formula $Li_{1-x}Ni_{1+x}O_2$ (X>0) is prepared. This means that excess lithium emerges during heating, and finally strongly alkaline components, such as LiOH and $Li_2O$, generate in the cathode material. Such strongly alkaline components have unfavorable effects on the electrolytic solution and processability of the cathode. As a result, not only battery performance but also ease of production and reproducibility may deteriorate. Accordingly, it is important for development of a lithium ion secondary battery consisting of lithium nickel mixed oxide cathode materials to establish a reproductive method of preparation of cathode material with the desired composition which prevents nickel atoms from shifting into lithium atom layers and strongly alkaline components from generating in the cathode material prepared.

Furthermore, an electrode using a carbonaceous material as the anode thereof has a problem in that the discharge capacity is too small with respect to the initial charge capacity (initial capacity loss is too large). Thus it is known that, when using an anode of carbonaceous material then, depending upon the type of carbon substance, a very large capacity loss at first cycle of 20% to 60% takes place and, after several cycles, the capacity loss decreases to a level of 10% or lower. In particular, a lithium ion secondary battery comprising an anode made of a carbon substance and using doping/undoping of lithium ions to and from the carbon substance forming the anode suffers from such an initial capacity loss. In the lithium ion secondary battery, lithium ions to be doped into the carbon substance forming the anode are supplied from the cathode through the electrolytic solution. The cathode must contain lithium ions in an additional quantity corresponding to the initial capacity loss. As a result, the volume and the weight of the battery are enlarged, thus resulting in a disadvantage in terms of increasing the energy density.

The initial capacity loss is considered to take place due to some causes, such as irreversible reactions taking place due to doping of alkali metal ions into a portion of the carbon substance from which doped ions cannot easily be removed, side reactions, such as decomposition of solvent or electrolyte, taking place due to functional groups existing on the surface of the carbon.

To overcome the problems experienced with the prior art, the present invention seeks to provide a cathode material exhibiting a large capacity and excellent charge and discharge cycle and a secondary battery having a cathode comprising such a material and exhibiting excellent performance.

SUMMARY OF THE INVENTION

Thus, considering to previous aspects, the present invention provides:

(1) a cathode material for a lithium ion secondary battery, which cathode material comprises a compound of the formula $$Li_{1-x-a}A_xNi_{1-y-b}B_yO_2.$$

wherein:

A is an alkaline earth metal element selected from the group consisting of magnesium, calcium, strontium and barium or is the alkali earth metal element strontium or barium alone;

B is at least one transition metal element other than Ni;

X is the total number of moles of A and if A consists of more than one alkaline earth metal element, then X is the total number of moles of all alkaline earth metal elements;

Y is the total number of moles of B and if B consists of more than one transition metal element, then Y is the total number of moles of all transition metal elements; and X, Y, a and b satisfy the respective equations:

$0 < X \leq 0.10$ $0 < Y \leq 0.30$ $-0.10 \leq a \leq 0.10$ $-0.15 \leq b \leq 0.15.$ (2) a method of preparing a cathode material, as defined in the above, comprising the step of: mixing a starting compound (a) containing lithium and A with a starting compound (b) containing nickel and B in a stoichiometric ratio (a):(b) of from 1.00:1.00 to 1.25:1.00; heating the mixture in an oxidizing atmosphere; and removing alkali components.

(3) a method of preparing a cathode material, as defined in the above, comprising the step of: mixing a starting compound (a) containing lithium and A with a starting compound (b) containing nickel and B in a stoichiometric ratio (a):(b) of from 0.90:1.00 to 1.00:1.00; heating the mixture in an oxidizing atmosphere without removal of alkali components.

(4) a non-aqueous solvent type secondary battery having a a cathode comprising a cathode material, as defined in the above.

(5) a non-aqueous solvent type secondary battery wherein an anode comprises an anode material with irreversible capacity, and a cathode comprises a cathode material and lithium-copper mixed oxide expressed by the chemical formula $Li_2CuO_2$.

DETAILED DESCRIPTION OF THE PREFERRED EMBODIMENTS OF THE INVENTION

We have energetically conducted investigations directed towards providing an improvement in the cycling characteristic, thus resulting in a cathode material being found which comprised a compound expressed by the general chemical formula $Li_{1-X-a}A_XNi_{1-Y-b}B_YO_2$ where A is strontium or barium, or is at least two kinds of alkaline earth metal element, B is at least one kind of transition metal element, X and Y satisfy $0<X\leq0.10$ and $0<Y\leq0.30$, a and b satisfy $-0.10\leq a\leq0.10$, $-0.15\leq b\leq0.15$, and if A and B consists of two or more kinds of elements, then X is the total number of moles of alkaline earth metal elements and Y is the total number of moles of all transition metal elements other than Ni. A preferred transition metal element is selected from manganese, scandium, titanium, vanadium, chromium, iron and cobalt.

In the present invention, the quantity of the one or more kinds of alkaline earth metal element to be substituted for lithium is reduced to 10% or less of lithium so that the cycling characteristic is improved in such a manner that a reduction in the capacity is prevented. Furthermore, the transition metal element is substituted for nickel so that the layered structure is maintained and electron conductivity is enhanced. It can be considered that an excellent cycle lifetime characteristic is obtained due to a synergistic effect obtainable from alkaline earth metal elements.

If X is larger than 0.10, then the alkaline earth metal element substituted for lithium inhibits diffusion of lithium ions as described above, whereby the alkaline earth metal elements contrarily serve as resistance components which considerably reduce the discharge capacity. To prevent reduction in the discharge capacity, it is preferable that X be smaller than 0.08, more preferably, be smaller than 0.05. If Y is larger than 0.3, the crystal structure becomes instable, thus resulting in deterioration in the cycling characteristic. It is preferable that Y be smaller than 0.25, more preferably Y be smaller than 0.2.

Furthermore, a and b represent deviation from stoichiometry. If a is less than −0.10, the cathode paste is apt to gel during kneading, and, if a is more than 0.10, discharge capacity decreases. In view of this point, preferably, $-0.05\leq a\leq0.05$ and more preferably, $-0.02\leq a\leq0.02$. On the other hand, if b is less than −0.15, discharge capacity decreases. If b is more than 0.15, the cathode paste is apt to gel during kneading. For that reason, preferably, $-0.08\leq b\leq0.08$, and more preferably, $-0.04\leq b\leq0.04$.

In a case where the component, such as the alkaline earth metal elements according to the present invention, is substituted and formed into a solid solution, it has been difficult to obtain a cathode material having a desired composition with a precise reproducibility even if mixing is performed with the desired composition.

As described above, it is considered that this problem is mainly caused by the shift of nickel atoms into lithium atom layers. As the result of energetical investigation into achieving the formation of a solid solution with a desired composition and into preventing this shift, we have found methods of preparing the cathode materials which may be carried out as follows;

That is, (1) the starting material containing lithium and alkaline earth metal element and the starting material containing nickel and the transition metal elements are mixed; the former is preferably in an excessive amount as compared with the latter. After the mixture is heated, strongly alkaline components generated are removed with water. To obtain the uniform mixture of lithium ion and alkaline earth metal element, it is preferable that the source of lithium has a low melting point. If necessary, the mixture may be kept for a suitable number of hours at a temperature near the melting point while at elevated temperature in the heating process. Thereby, the cathode material having a desired composition is reproducibly obtained, and because of the operation for removal of strongly alkaline components, such as washing with water, there are no unfavorable effects, on the processability of the cathode. As a result, a cathode with high capacity and excellent cycling characteristic is obtained.

Furthermore, (2) we also found a method of preparing the cathode material by which generation of strongly alkaline components in the cathode material as a final product can be prevented thereby avoiding the necessity for any subsequent operation, such as washing with water, for removal of the abundant strongly alkaline components. The method is characterized by mixing the starting material so that the sum of lithium atoms and alkaline earth metal atoms is less than that of all transition metal atoms including nickel atoms. No strongly alkaline component generates in the cathode material according to this method, and processability of the electrode comprising the cathode material is extensively improved. Incidentally, in the case of a $LiNiO_2$ cathode material, it is generally considered that nickel atoms shift more easily into the lithium atom layers, which results in a reduction of capacity due to inhibition of the diffusion of lithium ions in the crystal and a deterioration of the cycling characteristic due to generation of a rock-salt type crystal phase. In contrast, in the case of a cathode material containing an alkaline earth metal element according to the present invention, the deterioration of electrochemical characteristic does not take place. That is, the cathode material according to the present invention is very profitable from the viewpoints of its high electrochemical performance as well as its simplicity, ease of production and high reproducibility of the process, this ease of production also being in contrast with the very severe control of conditions which has generally being required during the preparation of a conventional $LiNiO_2$ cathode material.

Methods of preparing the cathode material according to the present invention will now be described. The lithium compound for use as the raw material is exemplified by the usual salts, such as lithium carbonate, lithium nitrate, lithium sulfate and lithium hydroxide; their hydrates; oxides, such as lithium oxide and lithium peroxide; and lithium iodide. The nickel compound is exemplified by salts, hydrates and oxides. Furthermore, as the alkaline earth metal elements and the 3d transition metal element, similar starting materials are employed. If any of the foregoing materials is employed, a similar cathode material can be obtained by optimizing the preparation conditions.

The starting material is prepared by mixing in such a manner that lithium and the alkaline earth metal element, which is the additional element, are present in respective amounts such that the stoichiometric ratio of lithium: alkaline earth element is from 1.00:1.00 to 1.25:1.00. The thus-prepared raw material is mixed sufficiently, and then it is molded if necessary to be easily formed into a solid solution. Then, the raw material is previously heated, usually at 300° C. to 800° C., in an oxidizing atmosphere of air or pure oxygen. Then, a ball mill or an automatic mortar is used to crush secondary particles, and then the raw material is fully heated, usually at 500° C. to 900° C., in a similar oxidizing atmosphere. Then, generated alkaline components (lithium oxide and alkaline earth metal oxide, etc) are removed, and then a pulverizing operation or classifying operation is performed to adjust the particle size so that the cathode material is prepared. Analysis of such a composition has confirmed that a uniform composition exhibiting a precise reproducibility can be obtained.

In the case of a method carried out without the step of removing the strong alkalis, lithium and additional alkaline earth metal elements are mixed, so as to be in a molar ratio of 0.90~1.00 times of all transition metal elements, then the cathode material is prepared by heating, pulverizing and classifying methods described above.

In a non-aqueous solvent type lithium ion secondary battery embodying the invention, the anode may be a carbonaceous material, the nature of which is not particularly limited. A substance obtained by carbonizing an organic substance is generally employed. In a case where the electron conductivity of the carbonaceous material is unsatisfactory in its ability to collect electric currents, it is preferable that a conductive agent be added.

If the carbonaceous material is carbon fiber, the nature of the carbon fiber is not particularly limited. In general, a substance obtained by carbonizing an organic substance is employed. Specifically, the carbon fiber is exemplified by PAN-type carbon fiber obtainable from polyacrylonitrile (PAN), pitch-type carbon fiber obtainable from pitch of coal or petroleum, cellulose-type carbon fiber obtainable from cellulose, and vapor growth carbon fiber obtainable from a gaseous or low molecular weight organic substance. Furthermore, carbon fiber obtainable by carbonizing polyvinyl alcohol, lignin, polyvinyl chloride, polyamide, polyimide, phenol resin or furfuryl alcohol may be employed. Among the carbon fibers above, an appropriate carbon fiber that satisfies the characteristics of the electrode and the battery comprising the carbon fiber must be selected to correspond to the characteristics. In a case where the carbon fiber is used as the anode of a secondary battery including a non-aqueous electrolytic solution containing alkali metal salt, it is preferable that the PAN-type carbon fiber, the pitch-type carbon fiber or the vapor growth carbon fiber be employed. From the viewpoint of enabling doping of alkali metal ions, in particular, lithium ions, to be performed satisfactorily, it is preferable that the PAN-type carbon fiber or the pitch-type carbon fiber be employed. Among the foregoing carbon fibers, it is preferable that a PAN-type carbon fiber, such as T-series of TORAYCA or M-series of TORAYCA manufactured by Toray Industries, Inc. or a pitch-type carbon fiber obtainable by carbonizing mesophase pitch coke be employed.

Although the electrode made of the carbon fibers may be in any form, it is preferred to arrange the fibers in one direction, or to make the fibers into a structure in the form of cloth or felt. Examples of a structure in the form of cloth or felt include woven fabric, knit, braid, lace, nat, paper, nonwoven fabric and mat. In view of the properties of the carbon fibers and the characteristics of the electrode, it is preferable that woven fabric or felt be employed. The carbon fibers are bonded to a metal current collector, such as copper foil, by a binder, and a conductive agent, such as carbon powder, can be added.

Having regard to operatibility and producibility, carbon fibers of short length (preferably 100 μm or less) are especially preferred. Just as conventional carbon powders, they can be employed to prepare the electrode with a conductive agent and a binder, and they have structural characteristics inherent in carbon fiber.

In a case where the carbonaceous material is employed as an anode it is recommended that $Li_2CuO_2$ which irreversibly deintercalates lithium ion and does not contribute to the subsequent doping/undoping be included in the cathode because $Li_2CuO_2$ releases a large amount of lithium ion which saturates inert sites of the anode material, such as carbon. As a result, the initial capacity loss of the anode can be compensated for and lithium contained in the foregoing cathode material can be used effectively. The quantity of lithium deintercalated from in the lithium-copper mixed oxide which occurs at the first charge is about 2.5 times the quantity of lithium in the foregoing cathode material and the foregoing cathode material which is necessary to compensate the initial loss can be replaced with 1/2.5 amount of $Li_2CuO_2$. This fact significantly contributes to enlargement of the capacity per unit volume of the battery. The content of the lithium-copper mixed oxide is appropriately changed in accordance with the degree of the initial capacity loss of the anode. It should be 0.3 to 1.5 relative to the equivalent amount of the initial capacity loss. Preferably, it should be 0.5 to 1.3, more preferably 0.8 to 1.2.

The electrolytic solution for a secondary battery according to the present invention is not particularly limited. Therefore any of conventional non-aqueous electrolytic solutions may be employed. Among these, a preferred electrolytic solution for the secondary battery consisting of a non-aqueous electrolytic solution containing the foregoing alkali metal salt is exemplified by propylene carbonate, ethylene carbonate, γ-butyrolactone, N-methylpyrrolidone, acetonitrile, N,N-dimethylformamide, dimethylsulfoxide, tetrahydrofuran, 1,3-dioxolane, methyl formate, sulfolane, oxazolidone, thionyl chloride, 1,2-dimethoxyethane, diethylene carbonate, their derivatives and mixtures. It is preferable that the electrolyte contained in the electrolytic solution be a halide or a salt of an alkali metal, particularly, lithium, such as perchlorate, thiocyanate, a salt of borofluoride, phosphoric fluoride, arsenous fluoride or aluminum fluoride or trifluoromethyl sulfate.

The secondary battery having an electrode according to the present invention having the characteristics of light weight, large capacity and high energy density, can be used widely in any of portable electronic apparatuses having a small size, such as video cameras, notebook personal computers, radio cassette recorders and portable telephone sets.

EXAMPLES

Examples of the present invention will be described hereafter. However, the interpretation of the scope of the present invention is not restricted to these examples by any means.

Examples 1 to 17

As the compound of the present invention, 17 types of compounds below are prepared as shown in TABLE 1 and evaluated. Among those, the method for preparing $Li_{0.98}Sr_{0.02}Ni_{0.90}Co_{0.10}O_2$ according to Example 1 is described in detail.

Commercially available high purity lithium nitrate ($LiNO_3$), nickel hydroxide ($Ni(OH)_2$), hydrate of strontium hydroxide ($Sr(OH)_2.8H_2O$) and cobalt hydroxide ($Co(OH)_2$), were weighed in the molar ratio corresponds to $Li_{1.10}Sr_{0.022}Ni_{0.90}Co_{0.10}O_2$ in terms of oxide, sufficiently milled with an automatic mortar, put into an alumina crucible, and pre-heated in a pure oxygen gas flow (flow rate: 1 liter/minute) at 650° C. for 16 hours in a furnace. The pre-heated material was then cooled to room temperature, and again milled with the automatic mortar for 30 minutes so that secondary aggregated particles were pulverized. In a similar atmosphere to the pre-heating, the pulverized particles were heated at 800° C. for 24 hours, and then cooled to room temperature. Then, the particles were milled in an agate mortar for 20 minutes, and the thus-obtained powder was washed with distilled water for 2 hours. Then, the powder was dried at 150° C. for 4 hours in a vacuum drier, and then it was again milled with the automatic mortar for one hour to obtain the cathode material of the present invention. The composition of the obtained powder was quantitatively analysed and found to correspond to the composition of $Li_{0.98}Sr_{0.020}Ni_{0.90}Co_{0.10}O_2$.

Next, the method of preparing a secondary battery for evaluating the charge/discharge characteristic is described. The cathode paste was prepared so that the foregoing cathode material: electro-conductive agent (acetylene black): binder (polyvinilidene fluoride) at ratio of 89 parts by weight: 4 parts by weight: 7 parts by weight were mixed in N-methyl pyrrolidone (NMP); and then the mixture was kneaded in an automatic mortar for 30 minutes in a nitrogen gas flow. The kneaded cathode paste was coated on an aluminum foil having a thickness of 20 μm, and dried in a dryer at 90° C. Then, the cathode paste was also coated on the reverse side and dried. Then, the cathode was pressed so that cathode had a thickness of 200 μm and a width of 10 mm and a length of 20 mm.

Then, the discharge capacity of the thus-prepared cathode was evaluated. A trielectrode cell was employed. The electrolytic solution contained 1M $LiBF_4$ and consisted of propylene carbonate and dimethylcarbonate (at a volume ratio of 1:1). Lithium metal foils were employed as a counter electrode and a reference electrode. The cell was charged to 4.2 V (vs.Li+/Li) at a constant current density per cathode material of 30 mA/g. After the charge, discharge to 3.0 V (vs.Li+/Li) was performed with the same current density. Then, the charge and discharge cycle was repeated 200 times and a capacity retention ratio expressed by the following equation was obtained.

Capacity Retention Ratio (%)={(discharge capacity at the 200th cycle)/(discharge capacity at the first cycle)}×100

In each of the other examples, the cathode material was prepared except that calcium, barium or magnesium was employed in place of strontium and copper, manganese or titanium in place of cobalt. The composition of the alkali metal element was quantitatively determined by a frame atomic absorption method and those of the other metal elements were quantitatively determined by an ICP emission spectroscopy. As a result, each element has the desired composition according to each example within allowable error range. The compositions of doped elements and results of quantitative analysis of the compositions are shown in TABLE 1.

Example 18

The method for preparing $Li_{0.96}Sr_{0.002}Ni_{0.90}Co_{0.10}O_2$ according to Example 1 is described hereafter in detail.

Commercially available high purity lithium hydroxide (LiOH), nickel hydroxide ($Ni(OH)_2$), hydrate of strontium hydroxide ($Sr(OH)_2.8H_2O$) and cobalt hydroxide ($Co(OH)_2$), were weighed in the molar ratio corresponds to $Li_{0.97}Sr_{0.002}Ni_{0.90}Co_{0.10}O_2$ in terms of oxide, sufficiently milled with an automatic mortar, put into an alumina crucible, and pre-heated in a pure oxygen gas flow (flow rate: 1 liter/minute) at 600° C. for 10 hours in a furnace. The pre-heated material was then cooled to room temperature, and again milled with the automatic mortar for 30 minutes so that secondary aggregated particles were pulverized. In a similar atmosphere to the pre-heating, the pulverized particles were heated at 750° C. for 12 hours, and then cooled to room temperature. Then, the particles were milled in an agate mortar for 1 hour to obtain a cathode material of the present invention. The composition of the cathode material was quantitatively analysed and found to correspond to the composition of $Li_{0.96}Sr_{0.002}Ni_{0.90}Co_{0.10}O_2$.

The method of preparing a secondary cell for evaluating the charge/discharge characteristics and the method of evaluating discharge capacity were the same as those of Example 1.

The composition of reactant and the composition of the products quantitatively analyzed are shown in TABLE 1. And the discharge capacities at the first cycle and the capacity retention ratios are shown in TABLE 2.

Further, a secondary battery comprising a cathode of this invention and an anode made of carbon fibers are also shown in Example 19.

Example 19

A test secondary cell was formed using an anode composed of commercialy available PAN-type carbon fiber (TORAYCA T-300, Toray Ind. Inc., 7 mg), a cathode composed of the cathode material (30 mg) prepared by Example 1 and a separator made of porous polypropylene film (Cell Guard #2500, Daicel Chem. Ind. Ltd.). The electrolytic solution consisted of propylene carbonate and dimethyl carbonate (the volume ratio of 1:1) containing 1M $LiPF_6$. The thus-prepared secondary battery was charged to a level of 4.10 V at a constant current density of 40 mA/g per weight of the carbon fiber. After the charge, discharge was performed at a constant current of 40 mA/g. The initial capacity (conversion in terms of the weight of the cathode material) and the capacity retention ratio of the battery are shown in TABLE 2.

TABLE 1

Reaction and Product Compositions

| Example | Reaction Composition | Product Composition |
|---|---|---|
| 1 | $Li_{1.10}Sr_{0.022}Ni_{0.90}Co_{0.10}O_2$ | $Li_{0.98}Sr_{0.02}Ni_{0.90}Co_{0.10}O_2$ |
| 2 | $Li_{1.05}Sr_{0.05}Ni_{0.90}Co_{0.10}O_2$ | $Li_{0.95}Sr_{0.05}Ni_{0.90}Co_{0.10}O_2$ |
| 3 | $Li_{0.99}Sr_{0.11}Ni_{0.90}Co_{0.10}O_2$ | $Li_{0.90}Sr_{0.10}Ni_{0.90}Co_{0.10}O_2$ |
| 4 | $Li_{1.10}Ba_{0.022}Ni_{0.90}Co_{0.10}O_2$ | $Li_{0.98}Ba_{0.02}Ni_{0.90}Co_{0.10}O_2$ |
| 5 | $Li_{1.05}Ba_{0.05}Ni_{0.90}Co_{0.10}O_2$ | $Li_{0.95}Ba_{0.05}Ni_{0.90}Co_{0.10}O_2$ |
| 6 | $Li_{0.99}Ba_{0.11}Ni_{0.90}Co_{0.10}O_2$ | $Li_{0.90}Ba_{0.10}Ni_{0.90}Co_{0.10}O_2$ |
| 7 | $Li_{1.10}Mg_{0.011}Ca_{0.011}Ni_{0.90}Co_{0.10}O_2$ | $Li_{0.98}Mg_{0.01}Ca_{0.01}Ni_{0.90}Co_{0.10}O_2$ |
| 8 | $Li_{1.10}Mg_{0.011}Ba_{0.011}Ni_{0.90}Co_{0.10}O_2$ | $Li_{0.98}Mg_{0.01}Ba_{0.01}Ni_{0.90}Co_{0.10}O_2$ |
| 9 | $Li_{1.10}Mg_{0.011}Sr_{0.011}Ni_{0.90}Co_{0.10}O_2$ | $Li_{0.98}Ba_{0.01}Sr_{0.01}Ni_{0.90}Co_{0.10}O_2$ |
| 10 | $Li_{1.10}Ca_{0.011}Sr_{0.011}Ni_{0.90}Co_{0.10}O_2$ | $Li_{0.98}Ca_{0.01}Sr_{0.01}Ni_{0.90}Co_{0.10}O_2$ |
| 11 | $Li_{1.10}Ca_{0.011}Ba_{0.011}Ni_{0.90}Co_{0.10}O_2$ | $Li_{0.98}Ca_{0.01}Ba_{0.01}Ni_{0.90}Co_{0.10}O_2$ |
| 12 | $Li_{1.10}Ba_{0.011}Sr_{0.011}Ni_{0.90}Co_{0.10}O_2$ | $Li_{0.98}Ba_{0.01}Sr_{0.01}Ni_{0.90}Co_{0.10}O_2$ |
| 13 | $Li_{1.10}Sr_{0.022}Ni_{0.90}Cu_{0.10}O_2$ | $Li_{0.98}Sr_{0.02}Ni_{0.90}Cu_{0.10}O_2$ |
| 14 | $Li_{1.10}Sr_{0.022}Ni_{0.90}Ti_{0.10}O_2$ | $Li_{0.98}Sr_{0.02}Ni_{0.90}Ti_{0.10}O_2$ |
| 15 | $Li_{1.10}Ba_{0.022}Ni_{0.90}Mn_{0.10}O_2$ | $Li_{0.98}Ba_{0.02}Ni_{0.90}Mn_{0.10}O_2$ |
| 16 | $Li_{1.10}Ba_{0.022}Ni_{0.80}Mn_{0.20}O_2$ | $Li_{0.98}Ba_{0.02}Ni_{0.80}Mn_{0.20}O_2$ |
| 17 | $Li_{1.10}Ba_{0.022}Ni_{0.70}Mn_{0.30}O_2$ | $Li_{0.98}Ba_{0.02}Ni_{0.70}Mn_{0.30}O_2$ |
| 18 | $Li_{0.97}Sr_{0.002}Ni_{0.90}Co_{0.10}O_2$ | $Li_{0.96}Sr_{0.002}Ni_{0.90}Co_{0.10}O_2$ |

Example 20

Furthermore, the initial capacity (with respect to the weight of the cathode material) and the capacity retention ratio of a battery prepared by using a cathode formed by substituting a the lithium-copper mixed oxide expressed by the chemical formula $Li_2CuO_2$ for 10% of the cathode material used in Example 19 are shown in TABLE 2.

TABLE 2

Initial Capacities and Capacity Retention

| Example | Initial Capacity (mAh/g) | Capacity Retention Ratio (%) | Example | Initial Capacity (mAh/g) | Capacity Retention Ratio (%) |
|---|---|---|---|---|---|
| 1 | 178 | 100 | 11 | 176 | 97 |
| 2 | 155 | 99 | 12 | 177 | 98 |
| 3 | 149 | 99 | 13 | 150 | 92 |
| 4 | 168 | 98 | 14 | 156 | 85 |
| 5 | 151 | 97 | 15 | 157 | 80 |
| 6 | 142 | 97 | 16 | 140 | 71 |
| 7 | 172 | 99 | 17 | 127 | 64 |
| 8 | 169 | 98 | 18 | 182 | 96 |
| 9 | 175 | 100 | 19 | 155 | 96 |
| 10 | 173 | 99 | 20 | 170 | 98 |

Comparative Example 1

A cathode material composed of $LiNiO_2$ was prepared similarly to Example 1 except that the third and fourth components were not added. The results of measurements of the initial capacity and the capacity retention ratio determined similarly to Example 1 are shown in TABLE 3.

Comparative Example 2

A cathode material composed of $Li_{0.80}Mg_{0.20}Ni_{0.90}Co_{0.10}O_2$ was prepared similarly to Example 1 except that magnesium was used in place of strontium and the quantity of additive was made to be 20 mol %. The results of measurements of the initial capacity and the capacity retention ratio determined similarly to Example 1 are shown in TABLE 3.

Comparative Example 3

A cathode material composed of $Li_{0.80}Sr_{0.20}Ni_{0.90}Co_{0.10}O_2$ was prepared similarly to Example 1 except that the quantity of strontium was 20 mol %. The results of measurements of the initial capacity and the capacity retention ratio determined similarly to Example 1 are shown in TABLE 3.

Comparative Example 4

A cathode material composed of $Li_{0.98}Ba_{0.02}Ni_{0.60}Mn_{0.40}O_2$ was prepared similarly to Example 15 except that quantity of manganese was 40 mol %. The results of measurements of the initial capacity and the capacity retention ratio determined similarly to Example 1 are shown in TABLE 3.

Comparative Example 5

A cathode material similarly to Example 1 was prepared except that the quantities of additive were determined to form $Li_{0.98}Sr_{0.02}Ni_{0.90}Co_{0.10}O_2$ and without washing operation. Although, the cathode material was kneaded with the organic solvent, the electro-conductive agent and the binder to obtain a paste, it gelled at 10 minutes after starting kneading. Thus, it was impossible to coat the kneaded material on the aluminium foil.

Comparative Example 6

A secondary battery was prepared similarly to Example 19 was prepared except the cathode material was replaced with that of Comparative Example 1. The battery was evaluated and the results are shown in TABLE 3.

TABLE 3

Initial Capacities and Capacity Retention

| Comp. Example | Initial Capacity (mAh/g) | Capacity Retention Ratio (%) | Comp. Example | Initial Capacity (mAh/g) | Capacity Retention Ratio (%) |
|---|---|---|---|---|---|
| 1 | 161 | 45 | 4 | 112 | 49 |
| 2 | 120 | 85 | 5 | | |
| 3 | 122 | 88 | 6 | 128 | 41 |

The compositions of cathode material of the comparative examples were quantitatively analysed and were found to in expected range. The reaction and product compositions of Comparative Example 1–4 are shown in TABLE 4.

TABLE 4

Reaction and Product Compositions

| Comp. Example | Reaction Composition | Product Composition |
|---|---|---|
| 1 | $Li_{1.10}Ni_{1.00}O_2$ | $Li_{1.0}Ni_{1.0}O_2$ |
| 2 | $Li_{0.88}Mg_{0.22}Ni_{0.900}Co_{0.100}O_2$ | $Li_{0.80}Mg_{0.20}Ni_{0.90}Co_{0.10}O_2$ |
| 3 | $Li_{0.88}Sr_{0.22}Ni_{0.900}Co_{0.100}O_2$ | $Li_{0.80}Sr_{0.20}Ni_{0.90}Co_{0.10}O_2$ |
| 4 | $Li_{1.10}Ba_{0.022}Ni_{0.60}Mn_{0.40}O_2$ | $Li_{0.98}Ba_{0.02}Ni_{0.06}Mn_{0.40}O_2$ |

As can be understood from TABLEs 2 and 3, the cathode material according to the present invention has the charge and discharge characteristics, in particular, cycling characteristic, that is superior to that of non-additive $LiNiO_2$ material according to Comparative Example 1. As can be understood from Examples 1 to 3 and Comparative Examples 2 and 3, the initial capacity is reduced if the value of x is larger than 0.10. As can be understood from Examples 15 to 17 and Comparative Example 4, the cycling characteristic deteriorates if the value of Y is larger than 0.30. The foregoing tendency is maintained even if the elements to be added are changed though a somewhat change takes place. Another element may be added into the cathode material according to the present invention so far as the performance of the electrode cannot be deteriorated.

As the cathode material prepared by Comparative Example 5 had strong alkalis, the paste which was the mixture of the cathode material, an electo-conductive agent and a binder gelled, it was impossible to obtain a favorable cathode. As can be understood from Examples 1 and 18, and Comparative Example 5, it is necessary to remove the alkalis from the cathode material or prevent the generation of the alkalis to obtain a favorable cathode.

As can be understood from Example 19 and Comparative Example 6, use of the cathode material according to the present invention enables a secondary battery exhibiting excellent cycling characteristic to be obtained.

As can be understood from Example 19 and Example 20, addition of $Li_2CuO_2$, which is the lithium-copper mixed oxide, to the cathode results in enlargement of the capacity per unit weight of the cathode material. Furthermore, a fact can be found that the cycle capacity retention ratio can be improved because the load involving when charge and discharge to and from the cathode material according to the present invention is performed can be reduced.

According to the present invention, a cathode material exhibiting a large capacity and excellent cycling characteristics and a secondary battery exhibiting excellent performance can be provided.

We claim:

1. A cathode material for a lithium ion secondary battery, which cathode material comprises a compound of the formula

$$Li_{1-x-a}A_xNi_{1-y-b}B_yO_2$$

wherein:

A is an alkaline earth metal component selected from the group consisting of (1) at least two of magnesium, calcium, strontium and barium, (2) strontium alone and (3) barium alone;

B is at least one transition metal element other than Ni;

X is the total number of moles of A and if A consists of more than one alkaline earth metal element, then X is the total number of moles of all alkaline earth metal elements;

Y is the total number of moles of B and if B consists of more than one transition metal element, then Y is the total number of moles of all transition metal elements; and X, Y, a and b satisfy the respective equations:

$$0 < X \leq 0.10$$

$$0 < Y \leq 0.30$$

$$-0.10 \leq a \leq 0.10$$

$$-0.15 \leq b \leq 0.15.$$

2. A cathode material according to claim 1, wherein A is strontium or barium alone.

3. A cathode material according to claim 1, wherein A is any two or more of the alkaline earth metals.

4. A cathode material according to claims 1, wherein X satisfies the equation:

$$0 < X \leq 0.08.$$

5. A cathode material according to claims 1, wherein X satisfies the equation:

$$0 < X \leq 0.05.$$

6. A cathode material according to claims 1, wherein Y satisfies the equation:

$$0 < Y \leq 0.25.$$

7. A cathode material according to claims 1, wherein Y satisfies the equation:

$$0 < Y \leq 0.20.$$

8. A cathode material according to claims 1, wherein a satisfies the equation:

$$-0.05 \leq a \leq 0.05.$$

9. A cathode material according to claims 1, wherein a satisfies the equation:

$$-0.02 \leq a \leq 0.02.$$

10. A cathode material according to claims 1, wherein b satisfies the equation:

$$-0.08 \leq b \leq 0.08.$$

11. A cathode material according to claims 1, wherein b satisfies the equation:

$$-0.04 \leq b \leq 0.04.$$

12. A method of preparing a cathode material comprising a compound of the formula $$Li_{1-x-a}A_xNi_{1-y-b}B_yO_2$$

wherein:
A is an alkaline earth metal component selected from the group consisting of (1) at least two of magnesium, calcium, strontium and barium, (2) strontium alone and (3) barium alone;
B is at least one transition metal element other than Ni;
X is the total number of moles of A and if A consists of more than one alkaline earth metal element, then X is the total number of moles of all alkaline earth metal elements;
Y is the total number of moles of B and if B consists of more than one transition metal element, then Y is the total number of moles of all transition metal elements; and
X, Y, a and b satisfy the respective equations:

$$0<X\leq 0.10$$

$$0<Y\leq 0.30$$

$$-0.10\leq a\leq 0.10$$

$$-0.15\leq b\leq 0.15.$$

which method comprises the step of: mixing a starting compound (a) containing lithium and A with a starting compound (b) containing nickel and B in a stoichiometric ratio (a):(b) of from 1.00:1.00 to 1.25:1.00; heating the mixture in an oxidizing atmosphere; and removing alkali components.

13. A method according to claim 12, wherein removal of alkali components is performed by washing with water.

14. A method of preparing a cathode material comprising a compound of the formula $$Li_{1-x-a}A_xNi_{1-y-b}B_yO_2$$

wherein:
A is an alkaline earth metal component selected from the group consisting of (1) at least two of magnesium, calcium, strontium and barium, (2) strontium alone and (3) barium alone;
B is at least one transition metal element other than Ni;
X is the total number of moles of A and if A consists of more than one alkaline earth metal element, then X is the total number of moles of all alkaline earth metal elements;
Y is the total number of moles of B and if B consists of more than one transition metal element, then Y is the total number of moles of all transition metal elements; and
X, Y, a and b satisfy the respective equations:

$$0<X\leq 0.10$$

$$0<Y\leq 0.30$$

$$-0.10\leq a\leq 0.10$$

$$-0.15\leq b\leq 0.15$$

which method comprises the step of: mixing a starting compound (a) containing lithium and A with a starting compound (b) containing nickel and B in a stoichiometric ratio (a):(b) of from 0.90:1.00 to 1.00:1.00; heating the mixture in an oxidizing atmosphere without removal of alkali components.

15. A non-aqueous solvent type secondary battery having a a cathode comprising a cathode material, which cathode material comprises a compound of the formula $$Li_{1-x-a}A_xNi_{1-y-b}B_yO_2$$

wherein:
A is an alkaline earth metal component selected from the group consisting of (1) at least two of magnesium, calcium, strontium and barium, (2) strontium alone and (3) barium alone;
B is at least one transition metal element other than Ni;
X is the total number of moles of A and if A consists of more than one alkaline earth metal element, then X is the total number of moles of all alkaline earth metal elements;
Y is the total number of moles of B and if B consists of more than one transition metal element, then Y is the total number of moles of all transition metal elements; and
X, Y, a and b satisfy the respective equations:

$$0<X\leq 0.10$$

$$0<Y\leq 0.30$$

$$-0.10\leq a\leq 0.10$$

$$-0.15\leq b\leq 0.15.$$

16. A non-aqueous solvent type secondary battery wherein an anode comprises an anode material with irreversible capacity, and a cathode comprises a cathode material and lithium-copper mixed oxide expressed by the chemical formula $Li_2CuO_2$.

17. A non-aqueous solvent type secondary battery comprising an anode and a cathode, where the anode comprises an anode material with irreversible capacity and the cathode comprises the cathode material of claim 1.

18. A non-aqueous solvent type secondary battery comprising an anode and a cathode, where the anode comprises an anode material with irreversible capacity and the cathode comprises the cathode material prepared by the method of claim 12.

19. A non-aqueous solvent type secondary battery according to claim 16, wherein a carbonaceous material is employed as an anode material.

20. A non-aqueous solvent type secondary battery according to claim 19 wherein the carbonaceous material is a carbon fiber.

21. A nonaqueous solvent type secondary battery according to claim 20, wherein the average length of the carbon fiber is 100 μm or less.

22. A non-aqueous solvent type secondary battery comprising an anode and a cathode, where the anode comprises an anode material with irreversible capacity and the cathode comprises the cathode material prepared by the method of claim 14.

* * * * *